United States Patent [19]

Kennicutt

[11] 4,163,413
[45] Aug. 7, 1979

[54] VEHICLE CONTROL SYSTEM
[75] Inventor: Robert B. Kennicutt, Morton, Ill.
[73] Assignee: Caterpillar Tractor Co., Peoria, Ill.
[21] Appl. No.: 878,123
[22] Filed: Feb. 9, 1978
[51] Int. Cl.² .................. F15B 13/06; F15B 13/09
[52] U.S. Cl. ................................ 91/521; 91/522; 60/486; 180/6.48
[58] Field of Search .............. 180/6.48, 6.3; 91/413, 91/414, 460, 521, 522; 60/420, 421, 427, 486, 416

[56] References Cited
U.S. PATENT DOCUMENTS 3,187,509  6/1965  Moon ................................. 60/389
3,774,707  11/1973  Bridwell et al. .................. 180/6.48
3,803,841  4/1974  Erickson et al. .................. 60/421
3,946,560  3/1976  MacIntosh et al. ............... 60/421

Primary Examiner—Edgar W. Geoghegan
Attorney, Agent, or Firm—Charles E. Lanchantin, Jr.

[57] ABSTRACT

A vehicle includes first and second drive transmission assemblies, each having a control element and associated control valve for selectively establishing forward and reverse operation thereof. A control system therefore includes a plurality of master and slave cylinders for individually moving the control elements, a first manual control for operating the transmission assemblies at substantially the same speed and direction, and a second manual control for controllably altering or overriding the first manual control for steering purposes.

20 Claims, 3 Drawing Figures

VEHICLE CONTROL SYSTEM

BACKGROUND OF THE INVENTION

The present invention relates to a vehicle control system, and more particularly to a system for operating a pair of transmission assemblies at substantially the same speed and direction, or at different speeds and directions for steering.

Many systems have been employed to transfer the power of an engine to the track units of a track-type vehicle. These fall mainly into two broad classifications—namely, mechanical systems and hydraulic or hydrostatic systems. The mechanical systems include a plurality of gears, shafts and clutches in order to transfer the power of the engine to the track units. Most of the mechanical systems use a brake, or brake and clutch combination, to lock one of the track units while the other track unit turns to provide a steering function for the vehicle. These mechanical systems necessarily use a large number of parts and an undesirable amount of energy is wasted during braking of one track member during a steering operation.

On the other hand, the hydraulic or hydrostatic systems employ variable displacement fluid pumps and motors for converting the mechanical energy of the engine into fluid energy to drive the track units. These hydraulic units are generally less complicated and bulky than mechanical drive units since many of the gears and shafts of the mechanical units are eliminated. An individual hydraulic motor is often provided for each track unit and steering is accomplished by merely changing the speed of one hydraulic motor relative to the speed of the other one. However, often times the control system thereof is complicated and requires much of the operator's attention and effort to drive and steer the vehicle which detracts from the important control of the implements mounted on the vehicle.

Furthermore, the prior control systems which have provided continuously powered controlled radius pivot steering and spot turning have heretofor been excessively complicated and expensive by virtue of the multiplicity of special valves and related components required. Despite the additional hardware, the results have often been less than optimum owing to the insensitivity or lack of responsiveness of the controls, and the difficulty and effort required to control the vehicle during steering and braking.

SUMMARY OF THE INVENTION

The present invention is directed to overcoming one or more of the problems as set forth above.

According to the present invention, a vehicle control system is provided for a vehicle having a pair of transmission assemblies, each transmission assembly having a control element and associated control valve for selectively establishing forward and reverse operation thereof. The control system includes a plurality of master and slave cylinders, a first manual control for selectively controlling the control elements through the master cylinders and operating the transmission assemblies at the same speed and direction, and a second manual control for controllably overriding the controlling of at least one of the control elements by the first manual control.

Preferably, the control system is utilized to control the movement of a vehicle such as a track-type tractor employing a pair of track chains individually driven by a pair of hydraulic or hydrostatic drive transmission assemblies.

BRIEF DESCRIPTION OF THE DRAWINGS

FIG. 3 is a rear elevational view of the speed and directional control lever and associated componentry forming a part of the control system of FIGS. 1 and 2.

DETAILED DESCRIPTION

Figure 1:
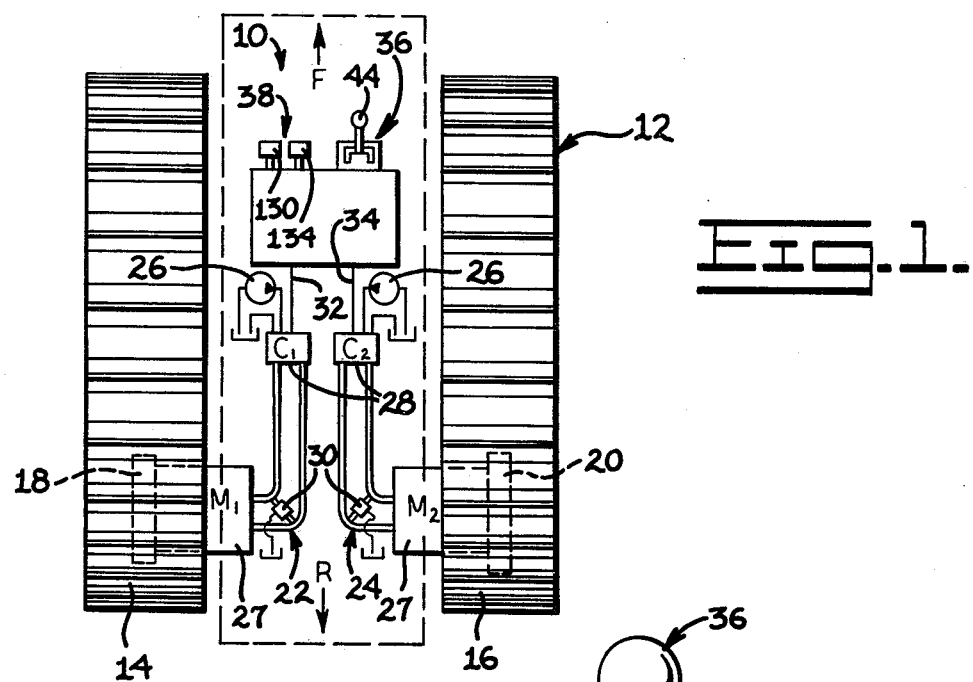
FIG. 1 is a diagrammatic plan view of a track-type tractor employing the control system of the present invention.

As diagrammatically illustrated in FIG. 1, a vehicle drive control system 10 embodying the principles of the present invention is shown in operating association with a vehicle such as a track-type tractor 12. The tractor has left and right ground engaging members or endless track chains 14 and 16 respectively driven by a pair of sprockets 18 and 20 in the usual manner. It is to be appreciated that the tractor has a normal longitudinal direction of travel, with the front of the tractor being located at the top when viewing this figure.

The control system 10 is used to control the speed and direction of a pair of hydraulic or hydrostatic drive transmission assemblies 22 and 24 located respectively at the left and right sides of the tractor 12. Each transmission assembly includes an engine driven infinitely variable displacement pump 26, a reversible and variable speed drive motor 27, and a control valve 28 for selectively controlling the direction and rate of pressurized fluid flow from the pump to the motor. Also, fluid replenishing and pressure relief valve means 30 is disposed across each of the motors to collectively define a closed hydraulic circuit of conventional construction on each side of the tractor. For a complete understanding of the present invention, it is only necessary to recognize that the left and right transmission assemblies 22 and 24 are independently operated by the positioning of a left control element 32 and a right control element 34 and the respective control valve 28 which is mechanically connected to each of these control elements. Basically, the control system 10 has first manual control means 36 and second manual control means 38 for selectively and controllably moving the control elements 32 and 34.

Figure 2:
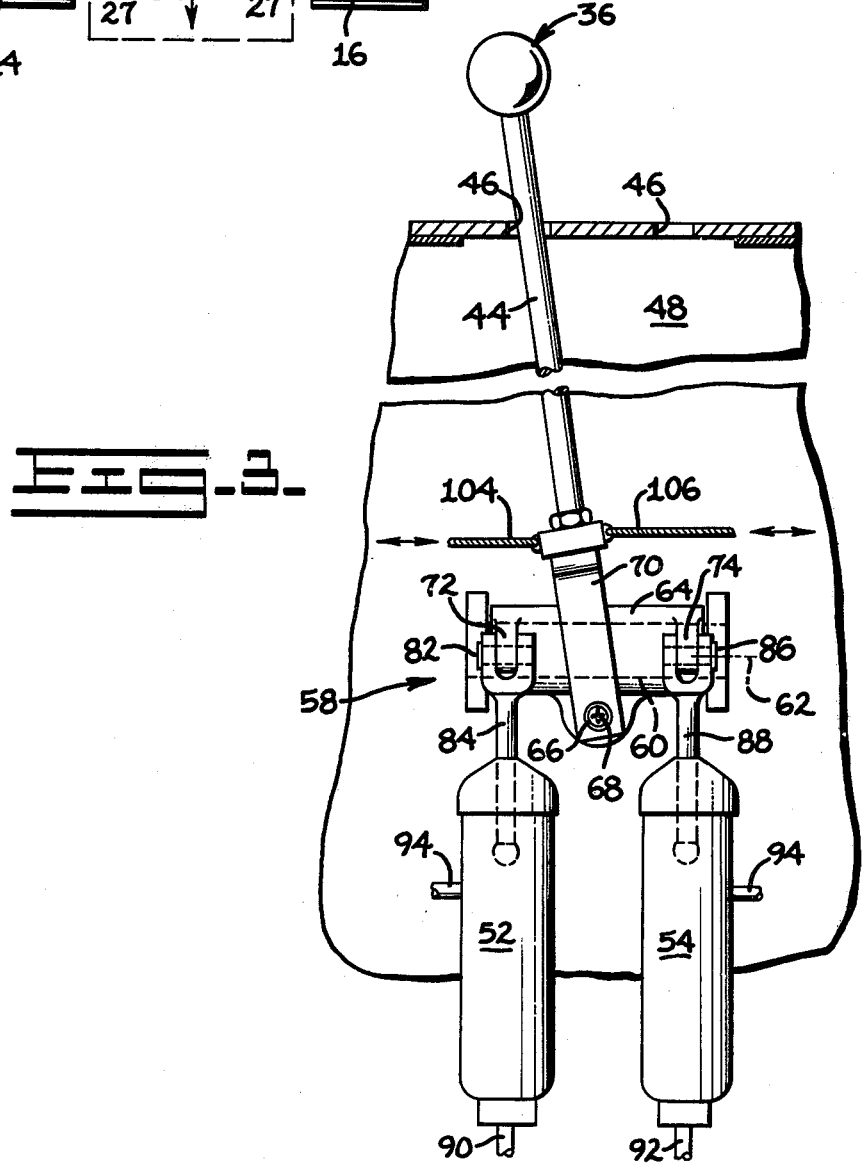
FIG. 2 is a schematic diagram of the overall control system used in FIG. 1, with certain portions in section broken open to better illustrate details of construction thereof.
Figure 2:
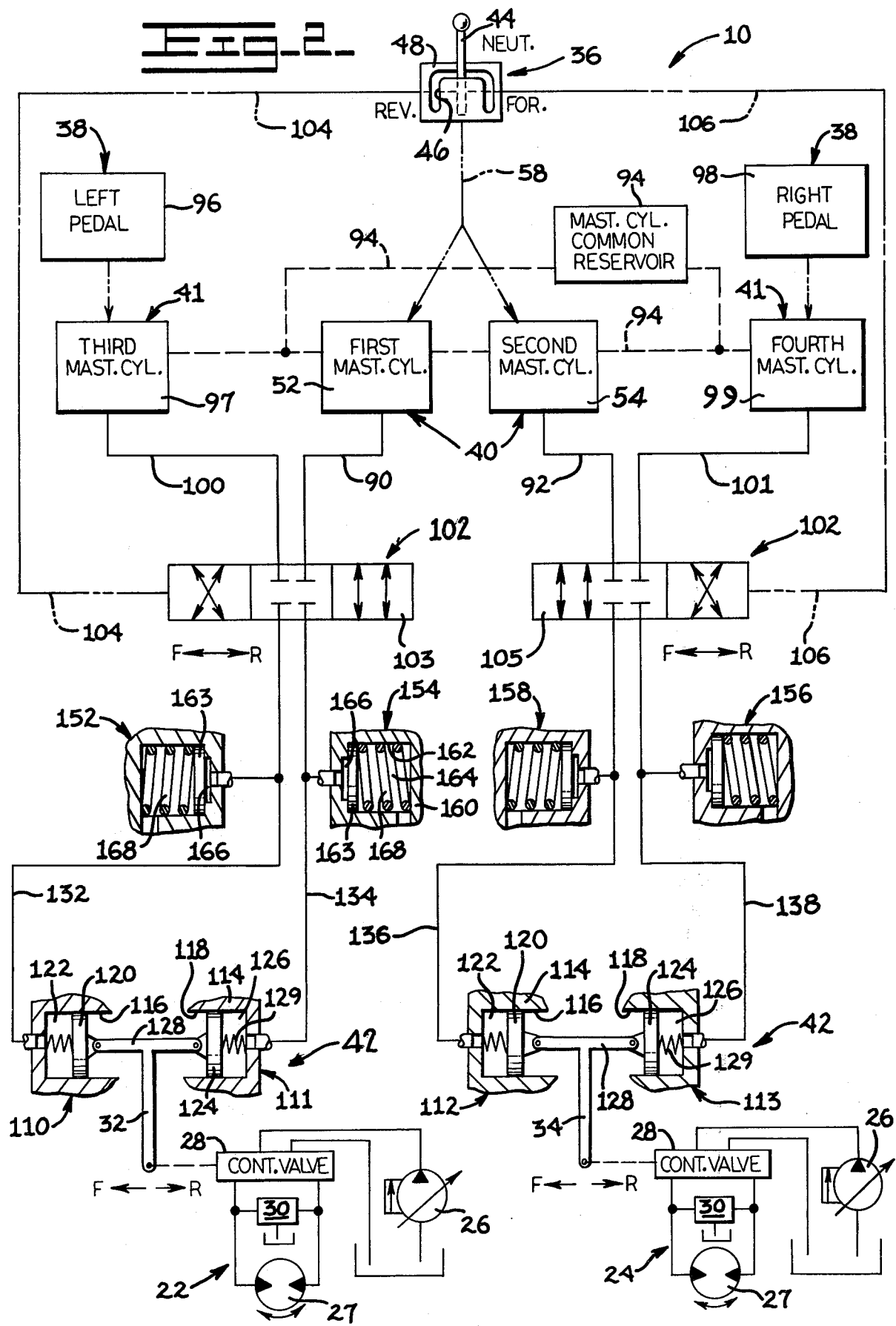

Referring now to the schematic diagram of FIG. 2, the control system 10 has first master cylinder means 40 directly operated by selective manipulation of the first manual control means 36, second master cylinder means 41 directly operated by selective manipulation of the left and right second manual control means 38, and slave cylinder means 42 remotely operated by the first and second master cylinder means for controlling the physical movement or displacement of the individual control elements 32 and 34. As shown in FIGS. 2 and 3, the first manual control means 36 includes a speed and directional control lever 44 which may be manipulated by the operator of the vehicle within an inverted U-shaped slot 46 of a control console or housing 48. The bight portion across the front of the slot provides a neutral condition, and the left and right legs of the slot respectively provide reverse and forward drive conditions. As the control lever is moved rearwardly in either leg the speed of the tractor 12 is increased proportionately in the selected direction. This is accomplished by mechanically associating movement of the control lever with movement of the master cylinder means 40.

More specifically, as shown best in FIG. 3, movement of the control lever 44 directly effects the joint operation of first and second master cylinders 52 and 54 of the first master cylinder means 40 through a linkage assembly 58. This linkage assembly includes a pivot shaft 60 suitably secured to the housing 48 along a lateral axis 62 and a generally cylindrical bushing 64 pivotally supported on the shaft. The bushing supports a pin 66 providing a generally longitudinally oriented axis 68, and the control lever has a depending yoke 70 pivotally secured to the pin. The yoke is thus coupled to the bushing in such a manner that rearward movement of the control lever in either leg of the slot 46 will cause unitary downward movement of a first arm 72 and a second arm 74 connected to the rotating bushing. As a result of this construction, a pivot pin 82 carried by the first arm and a depending control arm 84 pivotally coupled to this pin are rocked downwardly when viewing FIG. 3 so that the first master cylinder 52 is operated thereby. The opposite side of the linkage assembly 58 is substantially a mirror image of the left side, so that a pivot pin 86 carried by the second arm and a depending control arm 88 connected thereto are also rocked downwardly to operate the second master cylinder 54.

When the control lever 44 is in the bight or forward portion of the slot 46 the master cylinders 52 and 54 are in a neutralized or deactivated state. However, movement of the control lever rearwardly in either leg effects automatic and controllably modulated operation of these two master cylinders. Each master cylinder has an output port or conduit as is indicated by the respective reference numerals 90 and 92, and each master cylinder is connected to a common fluid supply source as indicated by the common reference numeral 94. Control signals are generated in such output conduits substantially proportionate to the downward movement of the arms 84 and 88.

Attention is now directed to the second manual control means 38 which, in general, controllably alters or overrides the operation of the first manual control means 36. Usually, actuation of the second manual control means permits selectively slowing down, stopping and reversing one of the transmission assemblies 22 or 24 relative to the opposite assembly for steering purposes of the tractor 12.

Preferably, the second manual control means 38 includes a left pedal 96 mechanically connected to a left auxiliary master cylinder or third master cylinder 97, and a right pedal 98 mechanically connected to a right auxiliary master cylinder or fourth master cylinder 99. These auxiliary master cylinders make up the second master cylinder means 41 and are substantially identical in construction to the master cylinders 52 and 54 of the first master cylinder means. Accordingly, each of the auxiliary master cylinders is also connected to the common fluid supply source 94 as indicated by the broken lines in FIG. 2, and each has an outlet conduit as indicated by the reference numerals 100 and 101.

Advantageously, the first control means 36 includes valve means 102 responsive to the positioning of the control lever 44 in the slot 46 for communicating the outlet conduits 90, 92, 100 and 101 with the slave cylinder means 42 in a particular manner or for blocking these conduits in the neutral position of the control lever. Such valve means preferably includes a first valve 103 and an associated connecting device 104 diagrammatically illustrated in FIG. 2 by a phantom line, and a second valve 105 and an associated connecting device 106 of similar construction. In the instant example the connecting devices are push-pull cables connected between the respective valves and the opposite sides of the speed and directional control lever 44 as partially shown in FIG. 3. Thus, transverse movement of the control lever will effect movement of both connecting cables. Specifically, movement of the control lever into the forward leg of the slot 46 will simultaneously position the three position valves into a forward mode of operation as indicated by the letter F in FIG. 2. In other words, the valve 103 is moved to the left and valve 105 is moved to the left when viewing the drawing from their centered or neutral positions shown which correspond to a centered position of the control lever. Movement of the control lever into the opposite or reverse leg will cause the valves 103 and 105 to be shifted fully to the right.

Referring now to the lower portion of FIG. 2, the slave cylinder means 42 may be noted to include a left pair of slave cylinders 110 and 111, and a right pair of slave cylinders 112 and 113, which are respectively associated with the control elements 32 and 34. Each pair of slave cylinders has a housing 114 defining opposite cylindrical bores 116 and 118. A piston 120 is reciprocably disposed in the bore 116 and defines a first chamber 122 in the housing, while a piston 124 is movable in the bore 118 and defines a second chamber 126 in the housing. Linkage means 128 is connected to the pistons and to the respective control element 32 or 34 of the left and right pairs of slave cylinders. Resilient biasing means 129 continually urges the pairs of pistons, the linkage means and the control elements toward a centered position corresponding to a neutral or blocking mode of operation of the respectively associated control valves 28. In the case of the left pair of slave cylinders 110 and 111, movement of the linkage means and control element 32 to the right when viewing the drawing from neutral provides a reverse drive establishing position of the control valve 28 as indicated by the letter R. Movement thereof to the opposite or left direction provides a forward drive establishing position as indicated by the letter F. The right pair of slave cylinders 112 and 113 operates in a like manner when compared to the left pair of slave cylinders insofar as the diagram is concerned as indicated by similar letter designations and movement indicator arrows.

The first and second chambers 122 and 126 of the left pair of slave cylinders 110 and 111 are in fluid communication with the first valve 103 via an inlet conduit 132 and an inlet conduit 134 respectively. Likewise, the first and second chambers 122 and 126 of the right pair of slave cylinders 112 and 113 are in fluid communication with the second valve 105 via an inlet conduit 136 and an inlet conduit 138 respectively.

Preferably, reset means in the form of a plurality of accumulators or fluid energy storage devices 152, 154, 156 and 158 are utilized during operation of the second control means 38 to permit overriding of the operation of the first control means 36. These accumulators are similar in construction and are respectively connected to the inlet conduits 132, 134, 136 and 138. As representatively indicated, each accumulator includes a housing 160 having a bore 162, a piston 163 movable in the bore and defining a spring chamber 164 and a pressure chamber 166 within the housing on either side of the piston. A spring or suitable biasing means 168 is disposed in each of the spring chambers to urge the respective pistons in a direction to close the pressure chambers in opposition to the pressure existing in the inlet conduits leading to the slave cylinders 110, 111, 112 and 113.

Operation of the control system 10 can be best understood by assuming that the control lever 44 is moved transversely from the centered position shown into an aligned position with one of the legs of the slot 46. For example, moving the control lever fully to the left when viewing the drawing will simultaneously result in positioning of the first valve 103 to the right through the action of the cable 104 connected therebetween, and positioning of the second valve 105 to the right through the action of the cable 106. Thereafter, rearward movement of the control lever within the left leg serves to proportionally increase the speed of the tractor 12 in reverse as follows. As shown in FIG. 3, such movement automatically rotates the bushing 64 about the axis 62, rocks the first and second arms 72 and 74 downwardly, and forces the depending control arms 84 and 88 down to activate the first and second master cylinders 52 and 54 to establish pressure signals in the conduits 90 and 92 substantially proportional thereto. As these conduits are pressurized, the conduits 132 and 136 leading to the first chambers 122 of the slave cylinders 110 and 112 shown in FIG. 2 are also simultaneously pressurized through the respective valves 103 and 105. Since the second chambers 126 are not pressurized when the second manual control means 38 is inactive, the pistons 120 are biased outwardly from the chambers 122 to shift the left and right control elements 32 and 34 to the reverse speed increasing positions as indicated by the direction indicating arrows. The control valves 28 directly respond to movement of their respective control elements so that the driven pumps 26 supply fluid to the left and right motors 27 for rotating the sprockets 18 and 20 and the track chains 14 and 16 at equal rates of speed in the reverse mode as may be visualized with respect to FIG. 1.

Assuming next that the operator wishes to slow down the left track chain 14 while moving in reverse to make a steering adjustment. This is achieved by partial depression of the left pedal 96. With such depression the left auxiliary master cylinder 97 connected thereto is actuated to provide a pressure signal in the conduit 100. Since the first valve 103 is disposed fully to the right in reverse, the conduit 100 is coupled directly to the conduit 134 through the first valve and such pressure signal is available at the second chamber 126 of the slave cylinder 111. In response to this overriding pressure, the piston 124 and linkage means 128 is urged to the left so that the control element 32 and its associated control valve 28 are also biased to the left. This reduces the fluid flow rate from the pump 26 to the motor 27 so that the left track chain 14 in FIG. 1 slows down while the right track chain 16 retains its original speed as dictated by the operation of the control lever 44 through the second master cylinder 54. It is significant to appreciate that the pressure in the opposite chamber 122 of the slave cylinder 110 is increased by the overriding pressure in the chamber 126. Simultaneously, the pressure in the inlet conduit 132 and the pressure chamber 166 of the accumulator 152 is increased. Accordingly, the piston 163 thereof is biased to the left or is retracted against the action of the spring 168 so that energy fluid is stored in that accumulator. Upon release of the left pedal 96 and accompanying release of the pressure signal in the inlet conduit 134 leading to the second chamber 126, the accumulator piston of the accumulator 152 extends to supply fluid back to the first chamber 122. This automatically reestablishes the originally selected position of the left pair of slave cylinders 110 and 111 and causes the tractor to return to straight reverse drive.

While for the purpose of illustrative convenience the accumulators 152, 154, 156 and 158 are shown in diagrammatically simplified form, it may be appreciated by those skilled in the art that more complex forms of accumulators can be utilized to obtain the desired pressure rise and pressure release characteristics in the inlet conduits 132, 134, 136 and 138 within the desired interval of time.

Another advantageous feature of the instant control system 10 is the direct relationship of the amount of depression of the pedals 96 and 98 to the overriding position of the control elements 32 and 34. For example, it is contemplated that depression of each one of the pedals about half way down will cause the respective slave cylinders 110 and 111, or 112 and 113 to be biased towards a central or neutralized position from the preselected directional mode of operation. When the control elements are thus centered, the control valves 28 are positioned to block flow of fluid from and to the motors 27 rather than enabling a freewheeling condition to exist. Accordingly, this is substantially equivalent to applying a brake since the motors are being urged to rotate by the sprockets 18 and 20 due to the momentum of the tractor in a particular direction, and since fluid can't get through the control valves 28 the fluid is returned via the replenishing and pressure relief valve means 30 back to the source. Further depression of one of the pedals will shift the respective slave cylinder, the control element and associated control valve 28 a distance sufficient to completely reverse the direction of rotation of the corresponding motor. Accordingly, when a pedal is depressed a distance less than about half way as described above a continously powered controlled radius pivot turn of the tractor is effected, when it is depressed about half way one of the track chains 14 or 16 is braked to provide a pivot turn, and when it is depressed beyond this a spot turn is effected with one of the track chains rotating in a direction opposite to the other.

Simultaneous depression of both of the pedals 96 and 98 the same amount will override the preselected forward or reverse conditions of the first and second master cylinders 52 and 54 and serve to slow down the vehicle. Upon release of both pedals the vehicle returns to traveling along at the originally preselected speed. Further simultaneously equal depression of the pedals, of course, will result in neutralizing or stopping both of the transmission assemblies 22 and 24. Still further simultaneous and equivalent depression of the pedals will result in movement of the vehicle in a direction opposite to that established by the control lever 44 in one of the legs of the slot 46.

In each of the above described cases of operation, the setting of the hand operated control lever 44 is overriden by depression of one or both of the foot operated pedals 96 and 98. Since the control lever remains in its preset condition by suitable internal friction means, not shown, the operator's hands are free to manipulate the implements or tools of the tractor. Moreover, when the pedals are released the tractor continues to operate in the preset conditions as determined by the control lever.

In view of the foregoing, it is apparent that the control system of the present invention is relatively simple in construction and ease of operation, and allows a vehicle such as a tractor to be steered or braked by pedals operated by the feet only so that the operator's hands are free for working the implements. Moreover, steering and braking can be immediately effected, and yet when the pedals are released the tractor is automatically returned to the originally selected speed and traveling conditions in a positive and reliable manner.

Other aspects, objects and advantages will become apparent from a study of the specification, drawings and appended claims.

The embodiments of the invention in which an exclusive property or privilege is claimed are defined as follows:

1. A vehicle control system for controlling first and second drive transmission assemblies each having a control element for selectively controlling forward and reverse operation of a respective transmission assembly, each of said control elements being associated with a respective control valve, the control system comprising:
    slave cylinder means for individually moving said control elements;
    master cylinder means for controlling operation of said slave cylinder means;
    first control means for selectively controlling said control elements through said master cylinder means and operating said transmission assemblies at substantially the same speed and direction; and
    second control means for controllably altering the controlling of at least one of said control elements by said first control means.

2. The control system of claim 1 wherein said first control means includes a hand operated control lever and linkage means to connect said control lever with said master cylinder means.

3. The control system of claim 1 wherein said second control means includes a pair of foot operated pedals.

4. The control system of claim 1 wherein said first control means includes a hand operated control lever and said second control means includes a pair of foot operated pedals.

5. The control system of claim 1 wherein said master cylinder means includes a master cylinder for each transmission assembly, said slave cylinder means includes a pair of slave cylinders for each transmission assembly, and said control system includes passage means for selectively placing each master cylinder in fluid communication with a respective one of said pairs of slave cylinders.

6. The control system of claim 5 wherein said second control means includes a pair of auxiliary master cylinders in fluid communication with said passage means.

7. The control system of claim 5 including a fluid energy storing accumulator associated with said passage means.

8. The control system of claim 1 wherein said master cylinder means includes first and second master cylinders, and said slave cylinder means includes first, second, third and fourth slave cylinders.

9. The control system of claim 8 wherein said first control means includes a control lever and means between said control lever and said master cylinders for operating said master cylinders together.

10. The control system of claim 8 including a separate outlet passage connected to each of said master cylinders, a separate inlet passage connected to each of said slave cylinders, and valve means for selectively communicating fluid between said outlet passages and said inlet passages.

11. The control system of claim 10 including a fluid energy storing accumulator connected to each of said inlet passages.

12. The control system of claim 10 wherein said second control means includes a pair of control members, a pair of auxiliary master cylinders individually operated by one of said control members, and a separate outlet passage from each auxiliary master cylinder in fluid communication with said valve means.

13. The control system of claim 10 wherein said first control means includes a lever having a forward position and a reverse position, said valve means being automatically positioned in response to movement of said lever to said forward or reverse positions.

14. The control system of claim 12 including cable means for connecting said lever and said valve means.

15. A vehicle control system for controlling a left and a right drive transmission assembly, each assembly having a control element for establishing forward and reverse operation thereof, the control system comprising:
    slave cylinder means for individually moving said control elements;
    first master cylinder means for controlling operation of said left and right slave cylinder means;
    first control means for selectively controlling the position of said control elements serially through said first master cylinder means and said slave cylinder means and operating said transmission assemblies at about the same speed and direction; and
    second control means including second master cylinder means for controllably overriding the controlling of at least one of said control elements by said first control means and operating said transmission assemblies at different speeds.

16. The control system of claim 15 wherein said first control means includes valve means for selectively communicating fluid between said first and second master cylinder means and said slave cylinder means.

17. The control system of claim 16 wherein said first control means includes a manually operated speed and directional control lever.

18. The control system of claim 17 wherein said second control means includes a left pedal and a right pedal.

19. The control system of claim 15 including reset means for reestablishing said controlling operation of said first control means upon deactivation of said second control means.

20. The control system of claim 19 wherein said reset means includes a plurality of fluid energy storage devices.

* * * * *